US005547066A

United States Patent [19]

Chang

[11] Patent Number: 5,547,066

[45] Date of Patent: Aug. 20, 1996

[54] GATHERING CHAIN PIN

[75] Inventor: Bobby Chang, Thousand Oaks, Calif.

[73] Assignee: R. R. Donnelley & Sons Company, Lisle, Ill.

[21] Appl. No.: 434,314

[22] Filed: May 2, 1995

Related U.S. Application Data

[63] Continuation of Ser. No. 165,104, Dec. 10, 1993, abandoned.

[51] Int. Cl.[6] .......... B65G 49/00

[52] U.S. Cl. .......... 198/644

[58] Field of Search .......... 198/644, 731; 270/53, 54, 55

[56] References Cited

U.S. PATENT DOCUMENTS

| | | | |
|---|---|---|---|
| 1,348,849 | 8/1920 | Christensen | 198/644 |
| 1,360,886 | 11/1920 | Christensen | 198/644 |
| 1,651,122 | 11/1927 | Hoffert | 198/644 X |
| 2,223,391 | 12/1940 | Schweizer | 271/12 |
| 2,810,468 | 10/1957 | Faeber et al. | 198/644 |
| 3,591,165 | 7/1971 | McCahon | 270/54 |
| 3,809,384 | 5/1974 | Zugel | 270/54 |
| 4,164,159 | 8/1979 | Marciniak | 83/280 |
| 4,236,706 | 12/1980 | Schlough | 270/53 |
| 4,519,599 | 5/1985 | Mayer | 270/53 |
| 4,522,384 | 6/1985 | Beckley | 270/54 |
| 4,546,961 | 10/1985 | Majewski et al. | 198/644 X |
| 4,968,017 | 11/1990 | Depetris | 271/12 |
| 5,028,193 | 7/1991 | Misicka | 412/8 |
| 5,067,699 | 11/1991 | Gadway et al. | 270/55 |

FOREIGN PATENT DOCUMENTS

| | | | |
|---|---|---|---|
| 0172684 | 12/1921 | United Kingdom | 198/644 |

*Primary Examiner*—James R. Bidwell

*Attorney, Agent, or Firm*—Marshall, O'Toole, Gerstein, Murray & Borun

[57] ABSTRACT

A gathering chain pin has a notch in a surface thereof. Because of the notch, the gathering chain pin is locked into a gathering chain link of a gathering chain and cannot be easily dislodged therefrom.

33 Claims, 3 Drawing Sheets

GATHERING CHAIN PIN

This is a continuation of U.S. patent application Ser. No. 08/165,104, filed Dec. 10, 1993, now abandoned.

TECHNICAL FIELD OF THE INVENTION

The present invention relates to a gathering chain pin for a gathering chain and, more particularly, to a gathering chain pin having a notch in a surface thereof so that the gathering chain pin is retained in engagement with the gathering chain.

BACKGROUND OF THE INVENTION

A conveyor is frequently used to move signatures between a number of operating stations. Signatures typically comprise one or more pages which are formed into newspapers, magazines, pamphlets, or the like. The operating stations, which are supplied with signatures by the conveyor, perform selected operations upon those signatures. These operations may include such functions as collating, trimming, binding, and the like.

One known conveyor for conveying signatures to various operating stations includes a gathering chain having a plurality of inverted V-shaped gathering chain links suitably attached to a chain which is propelled by one or more motor driven sprockets. Each of the inverted V-shaped gathering chain links has a pair of depending legs joined at an apex. A pair of openings, one in each of the depending legs, are aligned to receive a gathering chain pin. Gathering chain pins are inserted through the openings in selected ones of the gathering chain links. Signatures are dropped onto the gathering chain so that the backbones of the signatures ride on the apexes of the inverted V-shaped gathering chain links of the gathering chain. The signatures are gathered by corresponding gathering chain pins such that the signatures are then driven along with the gathering chain by their corresponding gathering chain pins.

One existing gathering chain pin has a generally arcuate body. The generally arcuate body has an inner surface formed by an inner radius of the generally arcuate body, and an outer surface formed by an outer radius of the generally arcuate body. The outer surface of the generally arcuate body has a ridge so that, as the gathering chain pin is inserted through the openings of a gathering chain link, the ridge engages with one of the depending legs of the gathering chain link to thereby prevent the gathering chain pin from being pushed all the way through the openings of the gathering chain link. Once inserted, the ends of the generally arcuate gathering chain pin point in a generally upward direction so as to engage a signature and thereby facilitate both the gathering of the signature and the movement of the signature by the gathering chain.

A gathering chain pin of this design frequently becomes at least partially dislodged from its gathering chain. If the gathering chain pin becomes sufficiently dislodged and slides far enough out of position, it can strike adjacent apparatus with enough force to break. A broken gathering chain pin may fail to properly gather signatures and/or may fail to properly move signatures from operating station to operating station. Accordingly, operating stations supplied with signatures by a gathering chain conveyor having one or more broken gathering chain pins may fail to properly operate on the signatures.

SUMMARY OF THE INVENTION

The present invention is directed to a gathering chain pin which is arranged so that it locks into position on a gathering chain. Accordingly, the gathering chain pin of the present invention dislodges much less frequently than prior gathering chain pins.

In accordance with one aspect of the present invention, a gathering chain link has first and second walls. The first wall has first and second surfaces and an opening therethrough from the first surface to the second surface of the first wall. The second wall has first and second surfaces and an opening therethrough from the first surface to the second surface of the second wall. The openings at the first and second walls are offset from one another. The second surface of the first wall and the first surface of the second wall are generally facing. A gathering chain pin extends through the openings of the first and second walls. The gathering chain pin has a notch. The notch has a first ridge engaging the first surface of the first wall, and a second ridge engaging the second surface of the second wall. The notch and the first and second ridges are arranged to retain the gathering chain pin in engagement with the first and second walls.

In accordance with another aspect of the present invention, a gathering chain has first and second surfaces and an opening between the first and second surfaces. A gathering chain pin extends through the opening of the gathering chain. The gathering chain pin has a first ridge engaging the first surface of the gathering chain, and a second ridge engaging the second surface of the gathering chain. The first and second ridges are arranged to retain the gathering chain pin in engagement with the first and second surfaces of the gathering chain.

In accordance with yet another aspect of the present invention, a gathering chain pin has a body. A surface of the body has a notch therein. The notch is arranged so that the gathering chain pin is retained by a gathering chain.

In accordance with a further aspect of the present invention, a gathering chain pin has a generally arcuate body with first and second ends. The generally arcuate body has an outside surface, an inside surface, and two wall surfaces. The outside surface, the inside surface, and the two wall surfaces extend between the first and second ends, and have a generally quadrilateral cross-section. One of the outside and inside surfaces has first and second ridges. The first and second ridges are arranged so that the gathering chain pin can be retained within at least one generally quadrilateral opening of a gathering chain.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
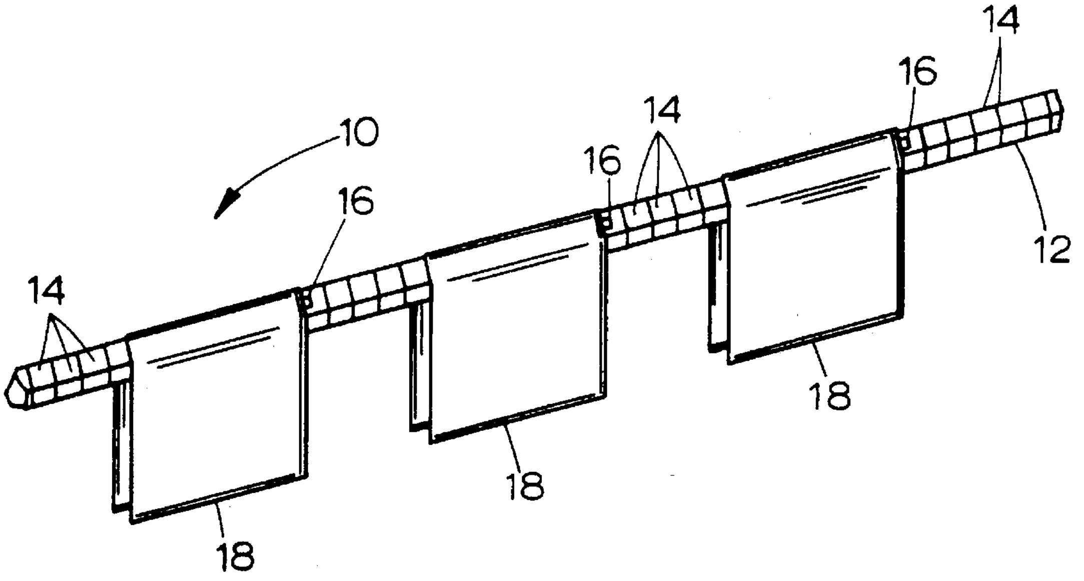
FIG. 1 illustrates a portion of a gathering chain conveyor with signatures gathered thereon.

The gathering chain conveyor 10 shown in FIG. 1 includes a gathering chain 12 having a plurality of gathering chain links 14. The gathering chain 12, for example, may be #40 DIAMOND® bindery chain supplied by the Diamond Chain Co. of Indianapolis, Ind. Inserted through corresponding openings in selected ones of the gathering chain links 14 of the gathering chain 12 are gathering chain pins 16 which gather and move signatures 18 in accordance with movement of the gathering chain 12. The gathering chain 12 of the gathering chain conveyor 10 may have sprockets (not shown) driven by motors (not shown) which drive the gathering chain 12 to move the signatures 18 by way of the gathering chain pins 16 between various operating stations which perform operations on the signatures 18.

Figure 2:
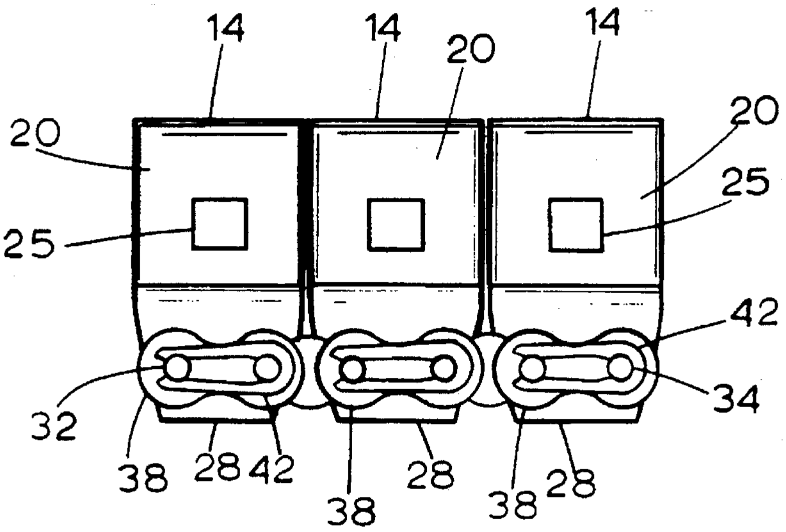
FIG. 2 illustrates several gathering chain links of the gathering chain conveyor shown in FIG. 1.
Figure 3:
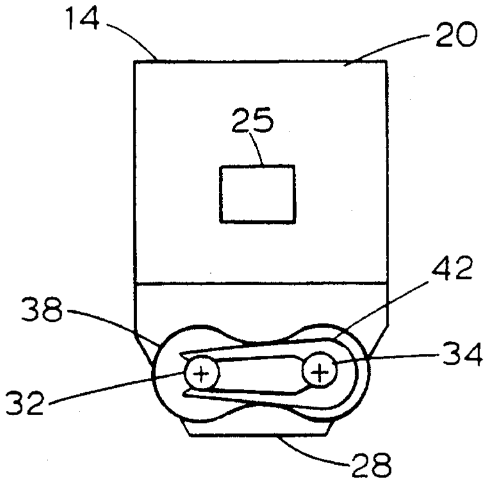
FIG. 3 is a side view of a single gathering chain link.
Figure 4:
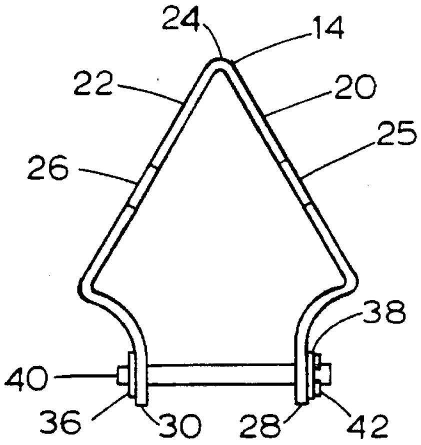
FIG. 4 is an end view of the single gathering chain link illustrated in FIG. 3.

A side view of several gathering chain links 14 of the gathering chain 12 are shown in FIG. 2, a side view of a single gathering chain link 14 is shown in FIG. 3, and an end view of a single gathering chain link 14 as shown in FIG. 4. The gathering chain link 14 has a generally inverted V-shape and includes a pair of depending legs or walls 20 and 22 joined at an apex 24. The depending leg 20 has an opening 25 therethrough, and the depending leg 22 has an opening 26 therethrough. Because of the V-shape of the gathering chain link 14, the openings 25 and 26 are offset from one another. The openings 25 and 26 may have a generally quadrilateral shape, as shown in the drawings. The depending leg 20 has a lower end 28, and the depending leg 22 has a lower end 30. A pair of pegs 32 and 34 extend in spaced apart relationship between the lower ends 28 and 30.

The pegs 32 and 34 extend through plates 36 and 38. The plate 36 abuts an outside surface of the lower end 30, and the plate 38 abuts an outside surface of the lower end 28. The peg 32 has a head 40 thereon which abuts and retains the plate 36 against the outside surface of the lower end 30 of the depending leg 22. The peg 34 has a similar head thereon which also abuts and retains the plate 36 against the outside surface of the lower end 30 of the depending leg 22. The pegs 32 and 34 have grooves (not shown) for receiving a retaining clip 42 in a conventional manner so that the pegs 32 and 34 are retained between the lower ends 28 and 30 of the corresponding depending legs 20 and 22 and so that the plate 38 is retained against an outside surface of the lower end 28 of the depending leg 20.

As shown in FIG. 2, the gathering chain links 14 may be suitably interconnected for drivingly receiving motor driven sprockets. These motor driven sprockets drive the conveyor chain 12 along a conveying path so that the signatures 18 are moved between various operating stations.

Figure 5:
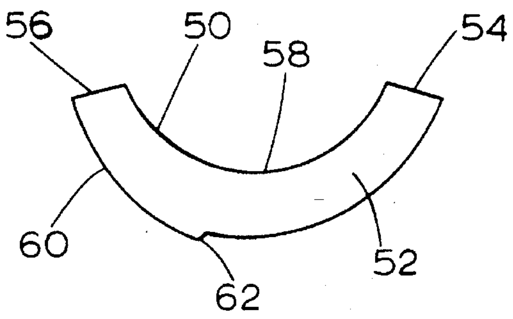
FIGURE 5 PRIOR ART
FIG. 5 illustrates a prior art gathering chain pin.

As shown in FIG. 5, a prior art gathering chain pin 50 has a generally arcuate body 52 with first and second ends 54 and 56. The generally arcuate body 52 has an inside surface 58 and a stepped outside surface 60. A ridge 62 is formed by the stepped outside surface 60 of the gathering chain pin 50.

When the gathering chain pin 50 is to be applied to a gathering chain link 14, the end 54 of the gathering chain pin 50 is inserted through the openings 25 and 26 of the gathering chain link 14 until the ridge 62 in the stepped outside surface 60 abuts either the outside surface of the depending leg 20 or the outside surface of the depending leg 22 depending upon whether the end 54 is first inserted through the opening 25 or through the opening 26. Retention of the gathering chain pin 50 within the gathering chain link 14 is dependent solely upon a friction fit between the gathering chain pin 50 and the depending legs 20 and 22 of the gathering chain link 14. However, this friction fit does not adequately prevent the gathering chain pin 50 from becoming dislodged from the gathering chain link 14 to such an extent that it can be struck and broken by adjacent apparatus.

Figure 6:
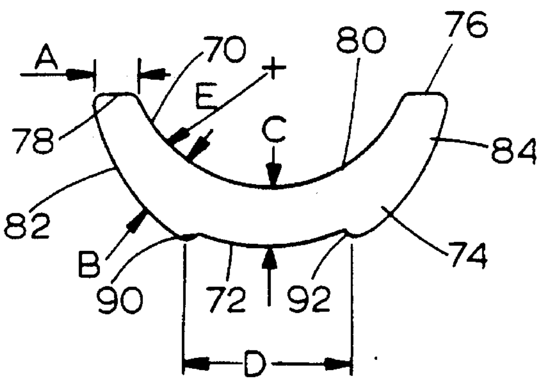
FIG. 6 is a side view of a gathering chain pin according to a preferred embodiment of the present invention.
Figure 7:
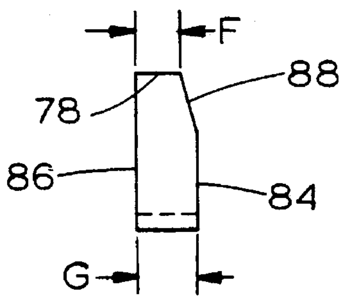
FIG. 7 is an end view of the gathering chain pin shown in FIG. 6.
Figure 8:
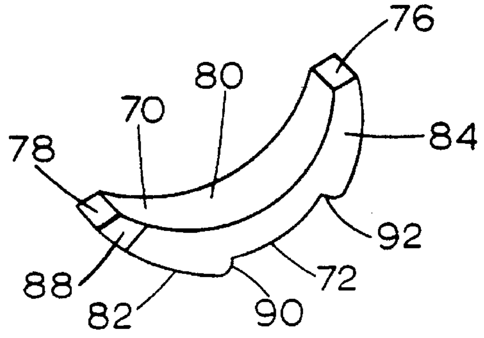
FIG. 8 is a perspective view of the gathering chain pin shown in FIGS. 6 and 7; and, FIG. 9 is an end view of a single gathering chain link having mounted thereto the gathering chain pin shown in FIGS. 6–8.

As shown in FIGS. 6, 7, and 8, a gathering chain pin 70 according to the preferred embodiment of the present invention is provided with a notch 72 to lock the gathering chain pin 70 in the gathering chain link 14 so that it cannot easily become dislodged. The gathering chain pin 70 has a body 74 with first and second ends 76 and 78. Preferably, although not necessarily, the body 74 has a generally arcuate shape. The body 74 has an inside surface 80 and an outside surface 82. The gathering chain pin 70 has a pair of side walls 84 and 86 between the inside surface 80 and the outside surface 82. The side wall 84 at the second end 78 of the gathering chain pin 70 is provided with a taper 88 to facilitate insertion of the gathering chain pin 70 into a gathering chain link 14. A pair of ridges 90 and 92 are formed by the notch 72 in the outside surface 82 of the gathering chain pin 70.

The following is an example of a set of dimensions which can be used for the gathering chain pin 70:

| | |
|---|---|
| A | 0.275 |
| B | 0.350 |
| C | 0.300 |
| D | 0.875 |
| E | 0.750 |
| F | 0.180 |
| G | 0.275 |

All of the above dimensions are in inches, and are meant to be by way of example only. Thus, any other set of suitable dimensions may be provided.

Each of the openings 25 and 26 of the depending legs 20 and 22 may be, for example, 0.260 by 0.290 inches. The body 74 may be fabricated from any material which is flexible so that the gathering chain pin 70 can be pushed through the openings 25 and 26 of the gathering chain link 14 until the gathering chain pin 70 locks onto the gathering chain link 14 and which resists forces due to jamming of signatures. For example, the body 74 of the gathering chain pin 70 may be fabricated of urethane, which is used for the fabrication of current gathering chain pins.

With the above dimensions, the gathering chain pin 70 is engaged with a gathering chain link 14 by inserting the tapered end 78 into one of the openings 25 or 26. The tapered end 78 is pressed through the first opening and then the second opening until the ridge 90 of the notch 72 engages an outside surface of one of the depending legs 20 and 22, and the ridge 92 of the notch 72 engages the outside surface of the other of the depending legs 20 and 22.

Figure 9:
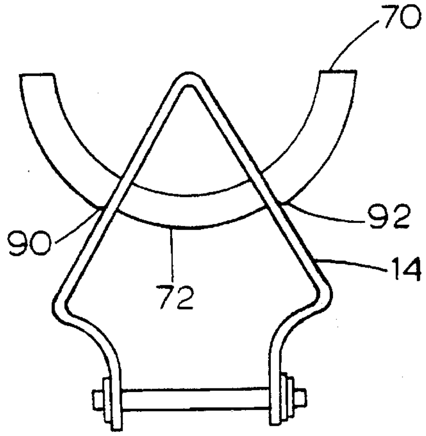

A gathering chain link 14, which has the gathering chain pin 70 fully inserted through the openings thereof, is shown in FIG. 9. As shown in FIG. 9, the ridge 90 of the notch 72 engages an outside surface of one of the legs of the gathering link 14, and the ridge 92 of the notch 72 engages an outside surface of the other leg of the gathering chain link 14. The dimensions of the gathering chain pin 70 relative to the openings 25 and 26 of the gathering chain link 14 insure a good pressure fit between the gathering chain pin 70 and the gathering chain link 14. Furthermore, the notch 72 of the gathering chain pin 70 locks the gathering chain pin 70 in the gathering chain link 14 so that the gathering chain pin 70 cannot be easily dislodged from the gathering chain link 14. The ends 76 and 78 of the gathering chain 70 generally point upwardly so that the gathering chain pin 70 can properly gather and move a signature 18 when that signature 18 is dropped onto the gathering chain 12.

Certain modifications will occur to those skilled in the art. For example, the gathering chain pin of the present invention may be used with forms of gathering chains other than the one shown herein or with other conveyors. Also, the gathering chain pin of the present invention may be more or less arcuate, or more or less U-shaped. All such modifications are considered to be within the scope of the present invention.

I claim:

1. A gathering chain link comprising:

a first wall having first and second surfaces and an opening therethrough from the first surface to the second surface of the first wall;

a second wall having first and second surfaces and an opening therethrough from the first surface to the second surface of the second wall; and, a gathering chain pin extending through the openings of the first and second walls, wherein the gathering chain pin has first and second ends, wherein the gathering chain pin has a notch between the first and second ends, wherein the openings of the first and second walls are offset from one another, wherein the second surface of the first wall and the first surface of the second wall are generally facing, wherein the notch has a first ridge engaging the first surface of the first wall and a second ridge engaging the second surface of the second wall, wherein the notch and the first and second ridges are arranged to retain the gathering chain pin in engagement with the first and second walls, and wherein the first and second ends of the gathering chain pin are larger than the openings of the first and second walls to ensure substantial centering of the gathering chain pin between the first and second walls.

2. The gathering chain link of claim 1 wherein the gathering chain pin has first and second ends, wherein the first end extends from the first surface of the first wall in a direction away from the second wall, and wherein the second end extends from the second surface of the second wall in a direction away from the first wall.

3. The gathering chain link of claim 2 wherein the first end of the gathering chain pin is tapered.

4. The gathering chain link of claim 2 wherein the gathering chain pin comprises a body of urethane, wherein the body has a surface, wherein the body has the first and second ends, wherein the surface of the body extends between the first and second ends, and wherein the notch is formed in the surface of the body.

5. The gathering chain link of claim 4 wherein the first end of the gathering chain pin is tapered.

6. The gathering chain link of claim 5 wherein the body is generally arcuate and has a quadrilateral cross-section.

7. The gathering chain link of claim 6 wherein the first and second walls join at an angle.

8. A gathering chain comprising:

first and second surfaces;

an opening between the first and second surfaces; and, a gathering chain pin extending through the opening, the gathering chain pin having a first ridge engaging the first surface and a second ridge engaging the second surface, the gathering chain pin having first and second ends, the first and second ends each having a cross section which is larger than the opening between the first and second surfaces, and the first and second ridges and the first and second ends of the gathering chain pin being arranged to retain the gathering chain pin in engagement with the first and second surfaces.

9. The gathering chain of claim 8 wherein the first end of the gathering chain pin extends from the first surface in a direction away from the second surface, and wherein the second end of the gathering chain pin extends from the second surface in a direction away from the first surface.

10. The gathering chain of claim 9 wherein the first end of the gathering chain pin is tapered.

11. The gathering chain of claim 9 wherein the gathering chain pin comprises a body of urethane, wherein the body has a surface, wherein the body has the first and second ends, wherein the surface of the body extends between the first and second ends, and wherein the first and second ridges are formed in the surface of the body.

12. The gathering chain of claim 11 wherein the first end of the gathering chain pin is tapered.

13. The gathering chain of claim 12 wherein the body is generally arcuate and has a quadrilateral cross-section.

14. A gathering chain pin having a unitary body, the unitary body having first and second ends and a surface extending between the first and second ends, the surface of the unitary body having a notch therein, the first end of the unitary body having a cross section which is larger than an opening of a gathering chain through which the gathering chain pin is inserted, the second end of the unitary body having a cross section which is larger than the opening of the gathering chain through which the gathering chain pin is inserted, the notch, the first end, and the second end being arranged so that the gathering chain pin is retained by the gathering chain.

15. The gathering chain pin of claim 14 wherein the first end is tapered.

16. The gathering chain pin of claim 15 wherein the unitary body comprises urethane.

17. The gathering chain pin of claim 16 wherein the unitary body is generally arcuate and has a quadrilateral cross-section.

18. The gathering chain pin of claim 14 wherein the notch forms first and second opposing ridges in the surface of the unitary body, the first and second ridges being arranged to lock the gathering chain pin onto a gathering chain.

19. The gathering chain pin of claim 18 wherein the first end is tapered.

20. The gathering chain pin of claim 19 wherein the unitary body comprises urethane.

21. The gathering chain pin of claim 20 wherein the unitary body is generally arcuate and has a quadrilateral cross-section.

22. A gathering chain pin having a generally arcuate body with first and second ends, wherein the generally arcuate body has an outside surface, an inside surface, and two wall surfaces, wherein the outside surface, the inside surface, and the two wall surfaces extend between the first and second ends, wherein the outside surface, the inside surface, and the two wall surfaces have a generally quadrilateral cross-section, wherein one of the outside and inside surfaces has first and second ridges, wherein the generally quadrilateral cross-section of the first end is larger than a generally quadrilateral opening of a gathering chain through which the gathering chain pin is inserted, wherein the generally quadrilateral cross-section of the second end is larger than the generally quadrilateral opening of the gathering chain through which the gathering chain pin is inserted, wherein the generally arcuate body with the first and second ends, the outside and inside surfaces, the wall surfaces, and the first and second ridges is of unitary construction, and wherein the first and second ridges and the first and second ends are arranged so that the gathering chain pin can be retained within the generally quadrilateral opening of the gathering chain.

23. The gathering chain pin of claim 22 wherein the first end is tapered.

24. The gathering chain pin of claim 23 wherein the generally arcuate body comprises urethane.

25. The gathering chain pin of claim 22 wherein the first and second ridges in the one of the outside and inside surfaces form the first and second opposing ridges arranged to lock the gathering chain pin onto a gathering chain.

26. The gathering chain pin of claim 25 wherein the first end is tapered.

27. The gathering chain pin of claim 26 wherein the generally arcuate body comprises urethane.

28. The gathering chain pin of claim 22 wherein the generally arcuate body comprises urethane.

29. The gathering chain link of claim 1 wherein the gathering chain pin at its notch is larger than the openings.

30. The gathering chain link of claim 1 wherein the first and second ends are larger than the openings so as to require substantial force to be exerted on the gathering chain pin when the first or second end of the gathering chain pin is pushed through the openings of the first and second walls.

31. The gathering chain link of claim 30 wherein the gathering chain pin at its notch is larger than the openings so that there is substantial pressure between the gathering chain pin and the first and second walls when the first ridge engages the first surface of the first wall and the second ridge engages the second surface of the second wall.

32. The gathering chain link of claim 1 wherein the gathering chain pin at its notch is larger than the openings so that there is substantial pressure between the gathering chain pin and the first and second walls when the first ridge engages the first surface of the first wall and the second ridge engages the second surface of the second wall.

33. The gathering chain link of claim 1 wherein the gathering chain pin is of one-piece unitary construction.

* * * * *